Nov. 26, 1935.   V. T. WREN   2,021,952
FREIGHT LOADING AND UNLOADING DEVICE FOR VEHICLES
Filed Aug. 3, 1934   3 Sheets-Sheet 2
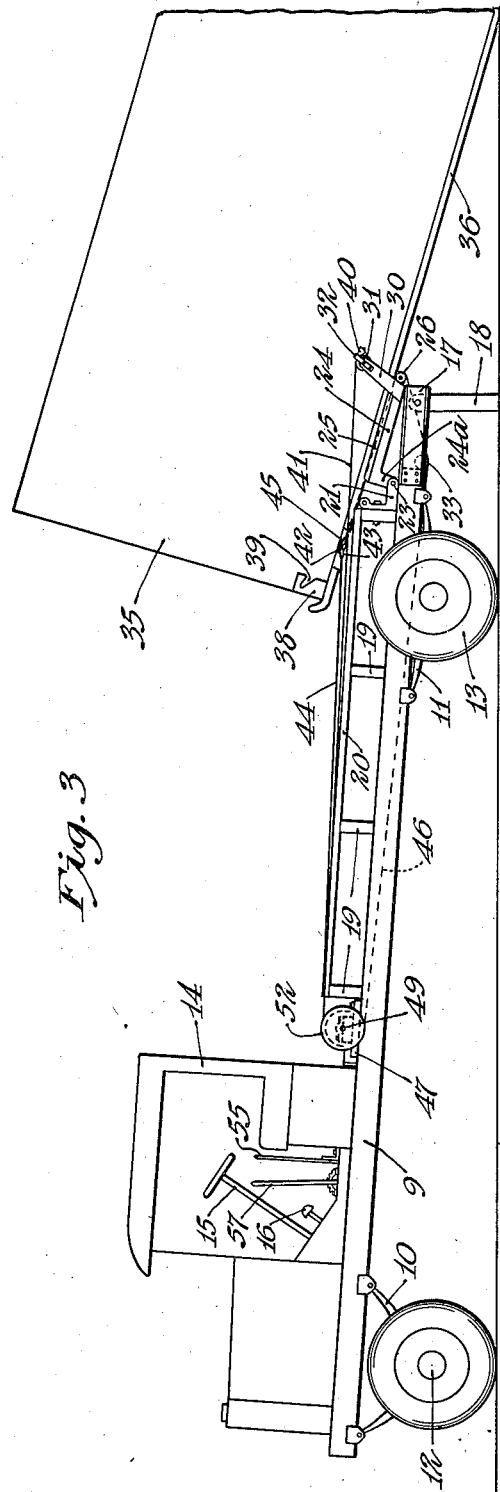
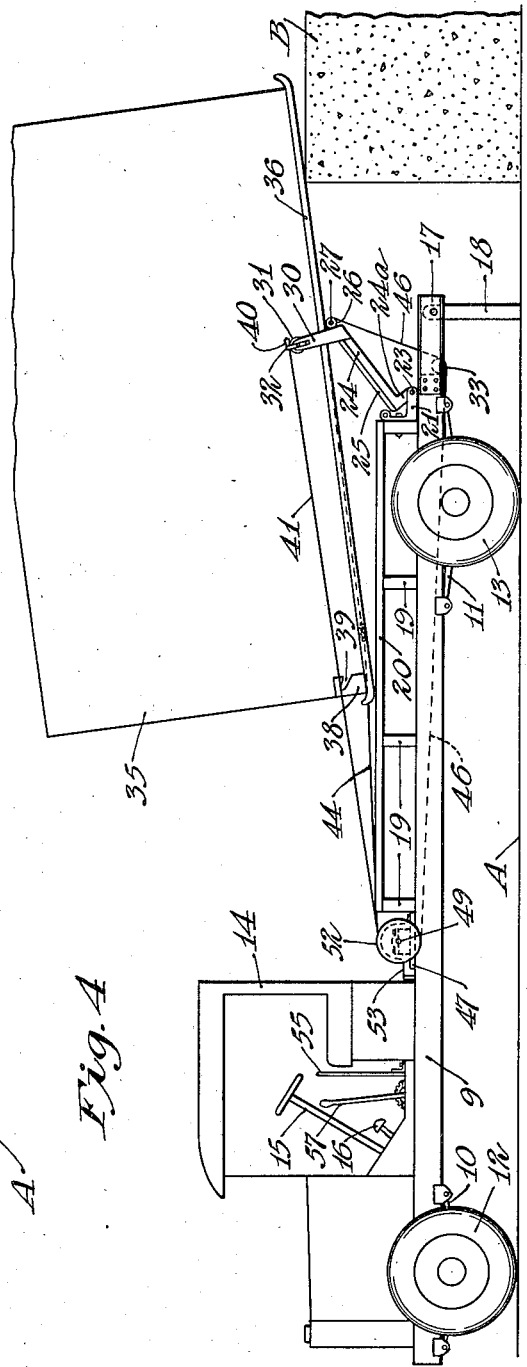
Inventor
Vincent T. Wren
By his Attorneys
Williamson & Williamson Nov. 26, 1935.  V. T. WREN  2,021,952
FREIGHT LOADING AND UNLOADING DEVICE FOR VEHICLES
Filed Aug. 3, 1934  3 Sheets-Sheet 3

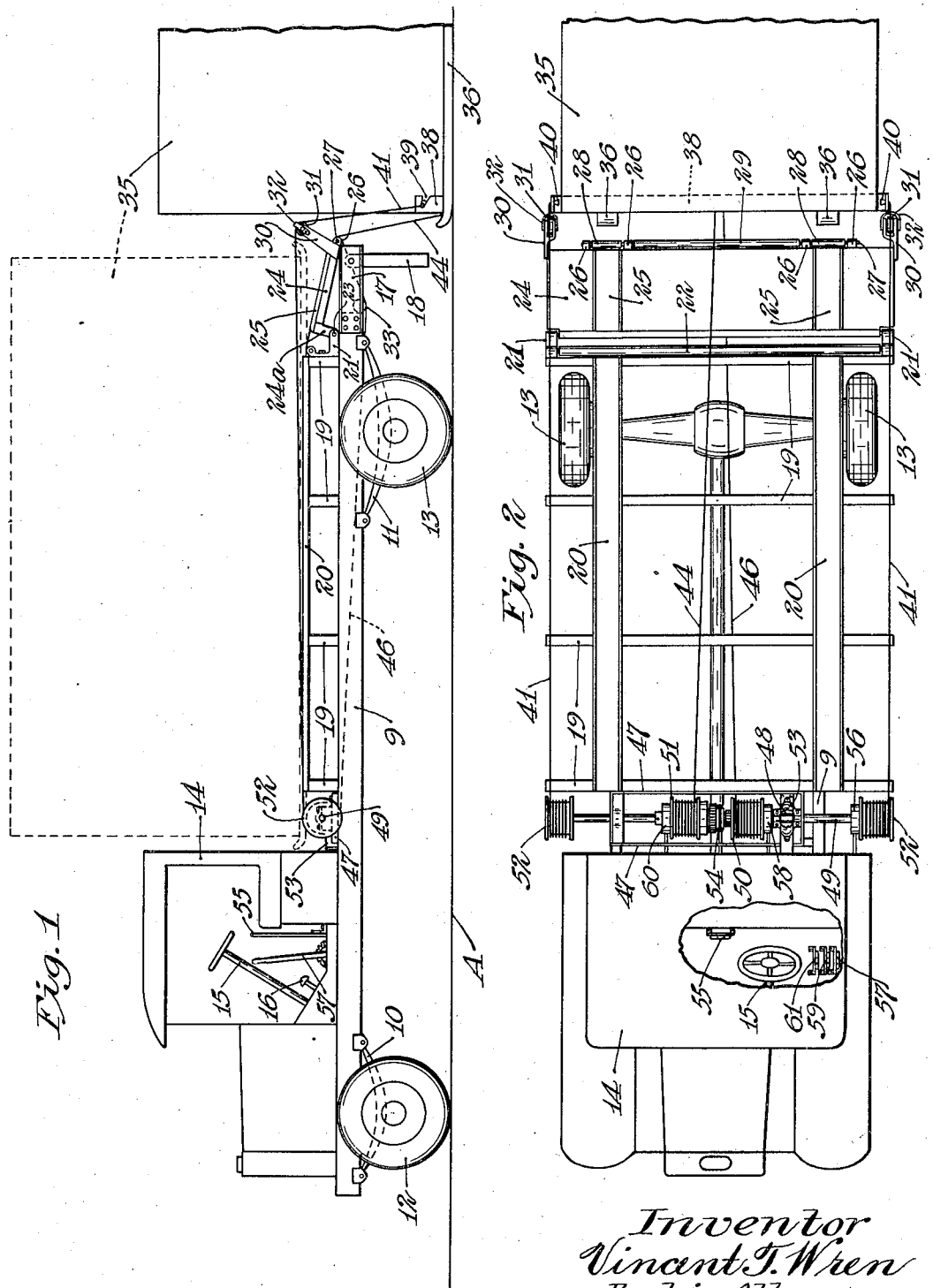

Inventor
Vincent T. Wren
By his Attorneys
Williamson & Williamson

Patented Nov. 26, 1935

2,021,952

UNITED STATES PATENT OFFICE 2,021,952

FREIGHT LOADING AND UNLOADING DEVICE FOR VEHICLES

Vincent T. Wren, Lakeville, Minn.

Application August 3, 1934, Serial No. 738,217

12 Claims. (Cl. 214—65)

This invention relates to freight loading and unloading devices for vehicles.

It is the general object of this invention to provide a novel and improved freight loading device of simple construction, which can be economically operated and efficiently used for loading freight when resting at different levels onto a vehicle and for unloading the freight therefrom to the ground or to platforms at various levels respective to the vehicle.

The objects and advantages of the invention will more fully appear from the following description, made in connection with the accompanying drawings, wherein like reference characters refer to the same or similar parts throughout the various views, and, in which, Fig. 1 is a view in side elevation illustrating a vehicle equipped with my loading and unloading device, the freight carrier of the device being shown in full lines resting on the ground and being shown in dotted lines in the position that it will assume when on the vehicle;

Fig. 2 is a plan view of the vehicle shown in Fig. 1;

Fig. 3 is a view in side elevation of the vehicle but illustrating the freight carrier and the vehicle in the positions that they will assume during certain periods of the loading and unloading operations;

Fig. 4 is a view in side elevation of the vehicle showing the parts as they will appear at certain times when the freight carrier is being loaded onto the vehicle from a platform higher than the vehicle, or as being unloaded from the vehicle onto such a platform;

Figure 5:
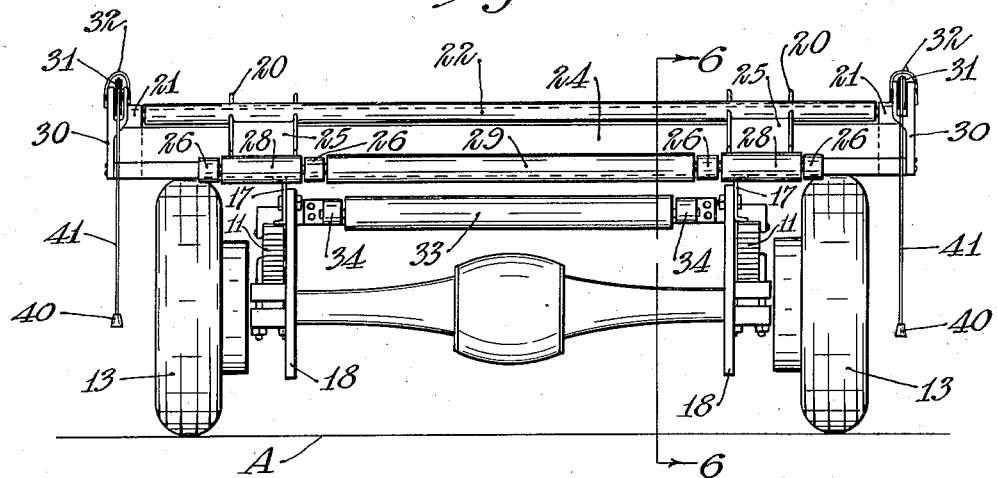
Fig. 5 is a view in rear elevation of the vehicle.
Figure 6:
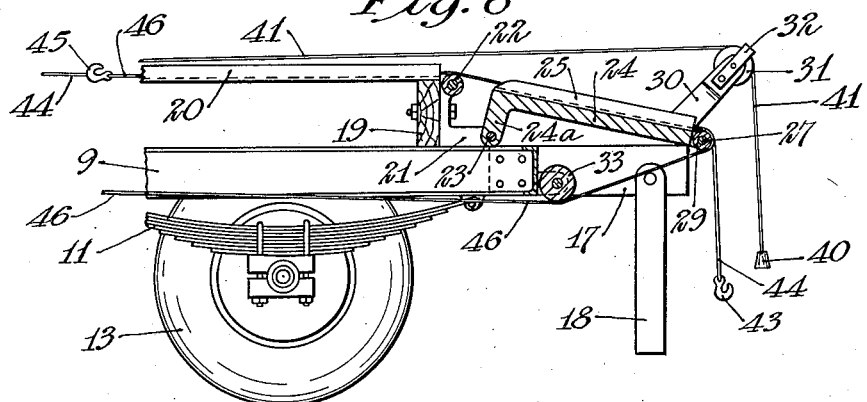
Fig. 6 is a vertical section taken on the line 6—6 of Fig. 5, as indicated by the arrows.

Referring to the drawings, portions of an ordinary truck chassis are illustrated, which include a chassis frame 9 supported by front springs 10 and rear springs 11 from a wheel equipped front axle 12 and a wheel equipped rear axle 13 respectively. The truck chassis is provided with the usual cab 14, steering wheel 15, and foot clutch lever 16. Preferably a pair of rearwardly extending bars 17 are connected to and project rearwardly from the rear ends of the side members of the frame 9. Supporting props 18 are pivotally connected to the bars 17 and project downwardly to a short distance above the ground level A when the frame 9 is at its normal level.

Extending between the side members of frame 9 and connected thereto above the frame are heavy cross sills 19. A pair of spaced parallel channel-shaped tracks 20 are connected to the upper edges of these sills and these tracks run longitudinally of the truck chassis. Heavy brackets 21 are connected to the rear sill 19 and these brackets have upwardly projecting arms within which a cross roller 22 is mounted. The upper surface of roller 22 projects just above the upper surfaces of the intermediate webs of the channel-shaped tracks 20.

The brackets 21 have lower rearwardly extending arms carrying a pivot rod 23 upon which a swinging tail gate 24 is pivoted. This tail gate has a downwardly extending forward cross piece 24a journaled on the pivot rod 23 and it carries on its upper surface channel-shaped tracks 25 in longitudinal alinement with the tracks 20. The tail gate 24 when in its normal downwardly swung position rests near its rear end on the rear ends of bars 17 but the tail gate may be swung upwardly as to the position shown in Fig. 4. Four brackets 26 project rearwardly from the rear end of the tail gate and support a cross shaft 27 on which two sleeve-like rollers 28 and one sleeve-like roller 29 are mounted. The two rollers 28 are in line with the channel-shaped tracks 20 and 25, while the roller 29 is intermediately disposed between the two central brackets 26.

Rigidly connected to the sides of the tail gate 24 at its rear end and projecting diagonally upwardly and somewhat rearwardly from the rear end of the tail gate are two heavy arms 30 which are forked at their upper ends and carry grooved sheaves 31. U-shaped keepers 32 are secured to the arms 31 and overlie the upper surfaces of the sheaves. It should be noted that the two sheaves 31 are located as far to the sides of the chassis as is possible and the arms 30 are cut away below the inner fork arms, as best shown in Fig. 5, to provide clearance below the sheaves.

A roller 33 is journaled in brackets 34 connected to the rear end of the frame 9 and the lower surface of this roller projects slightly below the level of the frame.

Figures 7, 8:
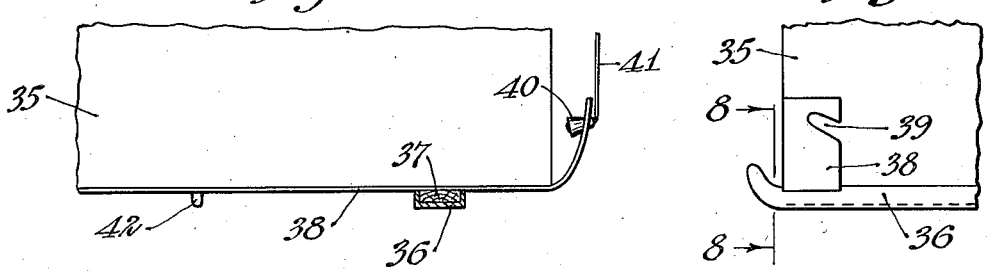
Fig. 7 is a view showing one lower front corner of the freight carrier in side elevation.
Fig. 8 is a vertical section taken on the line 8—8 of Fig. 7, as indicated by the arrows.

There is provided a freight carrier 35 and this freight carrier, although it may be differently constructed, is illustrated in the drawings as being a large open topped box within which freight can be conveniently loaded and the box has on its under side skids 36 which extend longitudinally of the box somewhat beyond the front and rear ends thereof, and these skids are preferably curved upwardly at their front and rear ends. As shown in Fig. 8 of the drawings, the skids 36 may be of channel construction, the channels in which are filled with wood strips 37 to make the skids as strong and as light as possible. The spacing between the two skids 36 corresponds to the spacing between the two tracks 20, and the two tracks 25. A strap 38 extends across the bottom of the box of the freight carrier at the forward end thereof and this strap has ends which curve upwardly and outwardly slightly and these ends of the strap are notched to form hooks 39 within which cones 40 connected to the rear ends of cables 41 may be readily engaged. Somewhat rearwardly of the forward end of the carrier 35 an eye 42 is secured to the under side of the carrier to releasably receive a hook 43 at the rear end of a cable 44 or/and to receive a hook 45 at the free end of a cable 46.

The forward sill 19 attached to the chassis frame is spaced slightly rearwardly from the cab 14 to permit of installation of what may be called a triple action power winch, which forms the subject matter of my co-pending application for United States patent filed simultaneously herewith and entitled "Freight loading and unloading winch for vehicles." It is sufficient to state here that this winch includes a suitable supporting frame 47, a cross sleeve 48, a shaft 49 extending through the sleeve and journaled in the frame 47, a winding drum 50 journaled on the sleeve, a winding drum 51 journaled on the shaft 49 and two winding drums 52 secured to the respective ends of the shaft 49 in line with the sheaves 31. Suitable driving mechanism 53 is provided for driving the sleeve 48 from the engine of the vehicle, when desired, and there is provided suitable gear shifting mechanism 54 controlled by a lever 55 in the cab 14 for selectively causing either the drum 50, the drum 51, or the shaft 49 carrying the drums 52 to rotate with the sleeve 48. In other words, it is possible to selectively turn either the winding drum 50, the winding drum 51 or the two winding drums 52. A brake 56 operating to prevent rotation of the shaft 49 and, accordingly, the drums 52, is controlled by a lever 57 in the cab 14, while another brake 58 operating to prevent rotation of the drum 50 is controlled by a second lever 59 in the cab of the vehicle. A third brake 60 operating to prevent rotation of the drum 51 is controlled by a third lever 61 from the cab of the vehicle. The various brakes 56, 58 and 60 can be independently applied and released so that all three, or one or more of the winding drums 52, 50 and 51 can be held from rotation. It will of course be understood that any substitute mechanism can be used in place of the triple power winch disclosed and claimed in my above identified co-pending application just so long as there are provided winding drums corresponding to the drums 50, 51 and 52, which can be independently operated and braked.

The forward ends of the cables 41 are connected respectively to the drums 52 and the forward portions of these cables are wound on these drums. The forward end of the cable 44 is connected to the drum 51 and the forward portion of this cable is normally wound on this drum. The forward end of the cable 46 is connected to the drum 50 and the forward portion of this cable is wound on this drum. The two cables 41 extend directly rearwardly from the drums 52 to pass over the sheaves 31. It should perhaps be here noted that the cones 40 connected to the rear ends of the cables 41 may engage between the keepers 32 and the sheaves 31 to cause upwardly swinging movement of the tail gate 24 when sufficient portions of the cables have been wound on the drums 52 and the drums are further rotated. The cable 44 normally extends rearwardly from the drum 51 and passes over the roller 22 and the roller 29. The cable 46 normally extending rearwardly from the drum 50, passes under the sills 19, extends under the roller 33 over the rear part of the roller 29 and extends forwardly over the roller 22.

*Operation*

Let us assume that the freight carrier 35 resting on the ground A is loaded with freight and that it is desired to load the freight carrier onto the truck. The truck will be backed up so that the rear end of the truck lies immediately adjacent the forward end of the freight carrier 35, whereupon the two cables 41 will be unwound sufficiently from the drums 52 to permit the cones 40 to be engaged with the hooks 39. The cones will be engaged with the hooks as best shown in Fig. 1, and at this time the tail gate 24 will be in its lowered position, as there shown.

Power will now be applied to the sleeve 48 through the driving mechanism 53 from the engine of the truck, and the shift lever 55 will be operated to cause the shaft 49 to rotate with the sleeve 48. The two drums 52 will then wind additional quantities of the cables 41 onto themselves and this will, of course, cause the forward end of the freight carrier 35 to be raised from the ground until the forward ends of the skids 37 are carried to a level above the rollers 28. The shift lever 55 may be then thrown to a neutral position so as to no longer cause rotation of the drums 52 and simultaneously the lever 57 may be operated to apply the brake 56 and thereby prevent back rotation of the drums 52. Cable 44 will now be drawn outwardly from the drum 51 and the hook 43 will be engaged with the eye 42 near the front end of the freight carrier 35. Of course, after the front end of the freight carrier had been raised from the ground, the rear end of the truck will tend to lower to compress the springs 11 while relieving the tension on the springs 10, but the props 18 through engagement of their lower ends with the ground will limit the possible lowering movement of the rear end of the truck, as best shown in Fig. 3. The shift lever 55 may now be operated to cause the drum 51 to revolve with the sleeve 48 to thereby wind additional quantities of the cable 44 onto the drum 51. As this action takes place, the freight carrier 35 will be drawn forwardly and the skids 37 will be carried over the rollers 28 and will find their way first onto the tracks 25. Then as the freight carrier continues to be moved forwardly, the skids 37 will ride over the roller 22 into the tracks 20, so that the parts will assume approximately the position shown in Fig. 3. Further rotation of the drum 51 will cause the freight carrier to be drawn forwardly on the truck to assume the position shown in dotted lines Fig. 1. The freight carrier is now completely loaded onto the truck and the truck can be driven to the point of destination of the freight carrier. During the time that the truck is being driven, the flanges of the channel-shaped tracks 20 will hold the freight carrier 35 in place to prevent it from jostling about on the truck and, of course, the brake 60 will be set so as to prevent rearward movement of the freight carrier 35 as the truck passes over bumps in the road.

When it is desired to unload the freight carrier from the truck, the hook 45 connected to cable 46 will first be engaged with the eye 43. Then assuming that the freight carrier is to be unloaded onto the ground A, the shift lever 55 will be operated to cause drum 50 to rotate with sleeve 48. As the drum 50 rotates, it will, of course, wind additional quantities of the cable 46 onto it and as the cable 46 from its point of attachment to the eye 42 of the freight carrier, passes first rearwardly over the rollers 22 and 29, and then forwardly under the roller 33, the freight carrier will be slid rearwardly in the tracks 20 until the rear end of the freight carrier projects considerably beyond the rear end of the tail gate 24. Then as the winding drum 50 continues to revolve, brakes 56 and 60 may be partially applied to prevent sudden unwinding movement of the cables 41 and 44 from the drums 52 and 51 respectively, and the consequent sudden dropping of the rear end of the freight carrier 35. By easing off the brakes 52 and 60 the rear end of the freight carrier may be lowered to the ground, whereupon the truck may be run forwardly somewhat to carry the rear end of the tail gate 24 forward of the front end of the freight carrier 35. The brakes 56 and 60, or, at least, one of them may then be eased off to allow the front end of the freight carrier to drop to the ground. The two hooks 43 and 45 may, if desired, be disconnected from the eye 42 before the forward end of the freight carrier is allowed to strike the ground, and, of course, the cones 40 will be disengaged from the hooks 39 after the forward end of the freight carrier has struck the ground. The unloading operation is then completed.

The freight carrier may be loaded onto the truck from a level above the level of the tracks 20 and it can also be unloaded from the truck onto a platform or the like above the level of the tracks 20. Referring to Fig. 4, there is illustrated a platform B above the level of the tracks 20. When it is desired to load the freight carrier 35 onto the truck from the platform B, the tail gate 24 will be first lifted by operation of the two drums 52, so as to carry the rollers 28 well above the level of the tracks 20. Of course, as the drums 52 are revolved, the cables 41 will be drawn up until the cones 40 engage between the keepers 32 and the sheaves 31. Further rotation of the drums 52 will lift the tail gate 24. When the tail gate has been lifted to the desired level the brake 56 may be set by operation of the lever 57 to hold the tail gate at the desired level. The hook 43 may then be engaged with the eye 42, whereupon the freight carrier 35 may be drawn onto the truck by operation of the winding drum 51. The skids 36 will first ride over the rollers 28 and then find their way into the tracks 20. After the freight carrier has been drawn forwardly onto the truck, the brake 56 may be gradually released to permit the tail gate 24 to drop.

When it is desired to unload the freight carrier 35 onto a platform, such as the platform B, the freight carrier will be first drawn rearwardly in the usual manner by operation of the winding drum 50 with the tail gate 24 swung downwardly until the rear end of the freight carrier projects some little distance beyond the rear end of the tail gate. The winding drums 52 can be then operated to swing the tail gate upwardly to approximately the position shown in Fig. 4, whereupon upon continued operation of the winding drum 50, the freight carrier may be drawn off the truck onto the platform B.

It will, of course, be appreciated that the freight carrier can be loaded onto the truck from platforms of various heights which extend to a level either below or above the level of the tracks 20, and similarly the freight carrier can be unloaded onto such platforms.

The present device is particularly adapted for use in pick up service by railroads, inasmuch as with the present device freight carriers can be delivered by a truck to points where the carriers may be filled, whereupon the loaded freight carriers may be picked up by the trucks and unloaded directly onto railroad flat cars without necessitating repacking of the goods. Then when the loaded freight carrier reaches its destination after being carried by the railroad, it can be readily delivered to the point of delivery.

It will, of course, be understood that various changes may be made in the form, details, arrangement and proportions of the various parts without departing from the scope of the present invention, which generally stated, consists in the matter shown and desribed and set forth in the appended claims.

What is claimed is:—

1. A freight loading device for vehicles including in combination a vehicle chassis, a freight carrier, a tail gate swingably connected to the rear end of said chassis, a roller mounted at the rear end of said tail gate, a sheave mounted at the rear end of said tail gate above the level of said roller, a first cable connectable to said carrier and running forwardly over said sheave, means on said chassis for winding up the forward portions of said cable, said cable and sheave including cooperating interengaging means which will engage to swing said tail gate upwardly when said cable has been wound up to a certain point and is further wound up, a second cable connectable at its rear end to said carrier and means on said chassis for winding up the forward end of said second cable.

2. A freight loading device for vehicles including in combination a vehicle chassis, a freight carrier, a tail gate swingably connected to the rear end of said chassis, a roller mounted at the rear end of said tail gate, a sheave mounted at the rear end of said tail gate above the level of said roller, a guide member attached to the bottom of said freight carrier, a track on said chassis forward of said roller to receive said guide member, a first cable connectable to said carrier and running forwardly over said sheave, means on said chassis for winding up the forward portions of said first cable, said first cable and sheave including cooperating interengaging means which will engage to swing said tail gate upwardly when said first cable has been wound up to a certain point and is further wound up, a second cable connectable at its rear end to said carrier and means on said chassis for winding up the forward end of said second cable.

3. The structure defined in claim 2, and means for holding said tail gate in a desired upwardly or downwardly swung position.

4. A freight loading device for vehicles including in combination a vehicle chassis, a freight carrier, a tail gate swingably connected to the rear end of said chassis, a roller mounted at the rear end of said tail gate, a sheave mounted at the rear end of said tail gate above the level of said roller, a roller mounted on said chassis immediately forward of said tail gate, a guide member on the bottom of said carrier, alined tracks on said tail gate and on the chassis forward of said tail gate respectively to receive said guide member, a first cable attachable at its rear end to said carrier and running forwardly over said sheave, means on said chassis for winding up the forward portions of said cable, said means being operable when said first cable is attached to said carrier to raise the forward end of the carrier above said first mentioned roller and means mounted on said chassis for drawing said carrier onto the chassis after the forward end of the carrier has been raised, said guide member passing over said two rollers and being received in said tracks as this action takes place.

5. A freight loading device for vehicles including in combination a vehicle chassis, a freight carrier, a tail gate swingably connected to the rear end of said chassis, a pair of rollers mounted in spaced relation at the rear end of said tail gate and over which said carrier may travel, a third roller mounted on said tail gate between said pair of rollers, sheaves mounted at the rear end of said tail gate above the level of said pair of rollers, a pair of cables connectable at their rear ends to said carrier and running forwardly over said sheaves, means on said chassis for winding up the forward portions of said cables, said cables and sheaves including cooperating interengaging means which will engage to swing said tail gate upwardly when said cables have been wound up sufficiently and are further wound up, a third cable connectable at its rear end to said carrier, means on said chassis for winding up the forward end of said third cable, a fourth cable having a rear portion normally extending below said third roller and projecting forwardly therefrom for attachment to said carrier and means mounted on said chassis for winding up the forward portion of said fourth cable.

6. The structure defined in claim 5, and means for holding said tail gate in a raised or lowered position.

7. The structure defined in claim 5, and braking means independently operable for said pair of cables, said third cable and said fourth cable.

8. The structure defined in claim 1, and individually controlled means for braking said two cables.

9. A freight loading device for vehicles including in combination, a vehicle chassis, a freight carrier, a roller mounted at the rear end of said chassis to receive said carrier, a sheave mounted at the rear of said chassis above the level of said roller, a cable attachable at its rear end to said carrier passing over said sheave and forwardly therefrom, means mounted on said chassis for drawing said cable forwardly and means for raising and lowering said roller and sheave relative to remainder of the chassis.

10. The structure defined in claim 9, and means for holding said sheave and roller at a desired raised or lowered position.

11. A freight loading device for vehicles including in combination, a vehicle chassis, a freight carrier, a tail gate swingably connected to the rear end of said chassis, a sheave mounted at the rear end of said tail gate above the level of said rear end, a cable connectable at its rear end to said carrier and running forwardly over said sheave, means on said chassis for drawing the rear end of said cable forwardly and means for raising and lowering said tail gate.

12. A freight loading device for vehicles including in combination, a vehicle chassis, a freight carrier, a tail gate swingably connected to the rear end of said chassis, a sheave mounted at the rear end of said tail gate above the level of the rear end of the tail gate, a first cable connectable rearwardly of said sheave to said carrier, and running forwardly over said sheave, means on said chassis for moving said cable forwardly, said cable and sheave including cooperating interengaging means which will engage to swing said tail gate upwardly when said cable has been drawn forwardly to a certain point and is further drawn forwardly, a second cable connectable to said carrier and means on said chassis for drawing said second cable forwardly.

VINCENT T. WREN.